United States Patent [19]
Huang et al.

[11] Patent Number: 5,874,517
[45] Date of Patent: Feb. 23, 1999

[54] METHOD TO REDUCE REGENERATED ACETALDEHYDE IN PET RESIN

[75] Inventors: Xiaoyan Huang, Gastonia; Ligia Dominguez, Charlotte, both of N.C.

[73] Assignee: Hoechst Celanese Corporation, Charlotte, N.C.

[21] Appl. No.: 997,402

[22] Filed: Dec. 23, 1997

[51] Int. Cl.$^6$ .................................................... C08G 63/02
[52] U.S. Cl. ............................................ 528/271; 528/272
[58] Field of Search ..................................... 528/176, 271, 528/272

[56] References Cited

U.S. PATENT DOCUMENTS 5,106,892  4/1992  Chilloe et al. .......................... 524/120
5,236,979  8/1993  Chilloe et al. .......................... 524/120

FOREIGN PATENT DOCUMENTS 0501545  9/1992  European Pat. Off. ........ C08G 63/87

*Primary Examiner*—Terressa Mosley
*Attorney, Agent, or Firm*—Gregory N. Clements; Walter M. Douglas

[57] ABSTRACT

There is disclosed a process for reducing the amount of acetaldehyde generated when polyethylene terephthalate (PET) chip is subjected to high temperatures in order to render the PET chip suitable for making food containers, particularly beverage bottles. This process comprises the addition of primary and secondary antioxidants either prior to or after the PET polycondensation reaction in order to reduce the amount of regenerated acetaldehyde produced by the polymer. The polyethylene terephthalate produced by this process reduces regenerated acetaldehyde by at least 25% in comparison to control resin produced without antioxidants, while maintaining suitable color for use as clear glass replacement. There is also disclosed a process for molding a PET preform wherein the polymer prepared as described above is melted, formed into the desired preform shape, and solidified by cooling. This preform can then be reheated above its glass transition temperature and molded into the desired container shape.

33 Claims, No Drawings

METHOD TO REDUCE REGENERATED ACETALDEHYDE IN PET RESIN

RELATED APPLICATIONS

This Application is related to U.S. patent application entitled "Method To Reduce Gel Formation in PET Resin", application Ser. No. 08/997,144, filed Dec. 23, 1997, which application was filed concurrently herewith and which is hereby incorporated by reference.

BACKGROUND OF THE INVENTION

This invention relates to an improvement in making polyethylene terephthalate useful in molding containers such as bottles. More specifically, this invention relates to an improved process for producing polyethylene terephthalate which is good for making beverage bottles.

The hazards of using glass containers for beverages such as beer or carbonated beverages are well known. Dangerous breakage often takes place due to the internal pressure exerted by the pressurized gas in the bottles as well as by dropping or otherwise impacting the bottles, not only in the course of production and distribution of the bottled product, but also in handling of the bottled product by consumers.

In recent years, plastic has been used to replace glass containers, especially in the carbonated beverage industry. Besides avoiding the hazards of breakage, plastic bottles also have the advantage of being much lighter than glass. Furthermore, less energy is required to make and transport plastic bottles.

Polyethylene terephthalate (hereinafter PET) is a polymer which is particularly well suited for such applications. In addition to providing safety and weight benefits, PET has the further advantage of chemical inertness and optical clarity. PET's superior clarity yields extremely clear bottles, providing superior aesthetics in comparison to other polymers, and replicating clear glass most closely.

PET may be prepared, as is well known, by the ester interchange of dimethyl terephthalate with ethylene glycol or by the direct esterification of ethylene glycol and terephthalic acid, followed by condensation polymerization (hereinafter "polycondensation") in the presence of a catalyst such as antimony trioxide, e.g., at a temperature of about 275°–300° C. and at an absolute pressure of about 1 millimeter of mercury. The PET product may then be extruded and pelletized to produce polymer chip.

The PET chip is then subjected to solid state polymerization in order to increase the polymer's intrinsic viscosity and to remove acetaldehyde produced in the pellets during manufacture. It is widely known in the art that the intrinsic viscosity of PET may be increased by solid state polymerization conducted in either air or an inert gas. In this connection, see e.g. U.S. Pat. Nos. 4,223,128 and 4,064,112, respectively. Polyester suitable for use in making beverage containers have a desirably high intrinsic viscosity, i.e., above about 0.60 deciliters per gram as calculated from measurements made on an 8% solution in o-chlorophenol at 25° C.

It is also widely known in the art that solid state polymerization may be used to eliminate acetaldehyde contained in the polyester chip. Acetaldehyde is one of several byproducts created during polycondensation, and remains in the polymer chip after polymerization is completed. Acetaldehyde must be minimized because it can introduce flavor to the drinks contained in the bottles, which is highly undesirable. The acetaldehyde trapped in the chip during the polycondensation reaction is widely known as "free" acetaldehyde. In addition to free acetaldehyde, acetaldehyde may also be formed by the further reaction or decomposition of PET and other byproducts ("acetaldehyde precursors") trapped in the polymer chip during polymer manufacture. Acetaldehyde produced from the reaction of trapped acetaldehyde precursors or which is formed during degradation occurring during the molding process is referred to as regenerated acetaldehyde. Reactions which produce regenerated acetaldehyde are induced when the polymer is subjected to high temperatures, such as those temperatures utilized in the injection molding process.

The elimination of acetaldehyde in beverage containers is important because the presence of acetaldehyde affects the taste of the beverages contained within the PET bottle. Stringent standards are imposed by molders producing beverage bottles, especially those molders who supply bottles for mineral water and cola flavored beverages. In particular, the amount of acetaldehyde present in bottles suitable for mineral water is extremely low.

Accordingly, a need exists for a commercially acceptable PET resin which does not generate significant amounts of acetaldehyde when heated for molding into a container or bottle.

In addition to the requirements above, PET resin suitable for use as a clear glass replacement must provide adequate aesthetic characteristics. The PET resin must produce a bottle which does not exhibit a high level of color in order to replicate the appearance of clear glass. In particular, in order to mimic clear glass, commercially produced PET resin is preferably characterized by a yellowness range of −30 to 6, most preferably by a range of −10 to 4 and is further characterized by a brightness value preferably in the range of 60 to 90 and most preferably in the range of 65 to 85.

DESCRIPTION OF THE PRIOR ART

The search has continued for improved processes for reducing acetaldehyde concentration in PET. Although chemical, physical, and engineering methods of acetaldehyde reduction are all known in the art, there is nonetheless room for improvement.

Antioxidants have been widely studied and used for preventing PET thermal and thermal oxidative degradation. Karayannidis discloses the use of hindered phenols to improve the thermal stability of polymers. Chilloe, et. al. discloses the use of a mixture of phosphites to improve the thermo-oxidative stability of PET in U.S. Pat. No. 5,106,892. Chilloe, et. al. subsequently discloses the use of hindered phosphite with tris(hydroxy-benzyl) benzene in U.S. Pat. No. 5,236,979.

Further, the use of a hindered phenol in conjunction with a combination of pentavalent and trivalent phosphorous compounds is given in EP 0 501 545 A1, in which a hindered phenolic phosphonate was used in combination with tributyl or diethyl phosphites in PET produced using an expensive polycondensation catalyst system containing germanium oxide.

However, no prior art has been found in which the use of antioxidants was employed in PET resin produced with conventional catalyst systems without detrimentally impacting color. Further, no prior art has been found employing the specific combination of antioxidants of the instant invention in order to reduce acetaldehyde. Further, the quality standards set forth for PET resin suitable for use in beverage bottles are higher than those imposed on PET resin for use in many applications, such as film and molded piping. These quality standards relate to regenerated acetaldehyde and color in particular. No prior art has employed the specific combination of antioxidants of the instant invention in order to reduce regenerated acetaldehyde while maintaining color values acceptable for bottle resin.

OBJECTS OF THE INVENTION

Accordingly, an object of the present invention is to provide an economical process for reducing the levels of regenerated acetaldehyde in PET which is intended for use in preparing PET containers such as beverage containers while maintaining adequate color.

A more specific object of the invention is to provide an improved PET resin for use in those applications which require a regenerated bottle head space acetaldehyde level in the range of 0 to 4 $\mu$g/l, or any application in which extremely low levels of acetaldehyde are specified.

A further specific object of the instant invention is to provide a PET resin retaining color values which mimic clear glass while producing extremely low levels of regenerated acetaldehyde.

These and other objects, as well as the scope, nature and utilization of the claimed invention, will be apparent to those skilled in the art from the following detailed description, examples and the appended claims.

Ratios or proportions of materials are given throughout this specification on a weight basis unless otherwise indicated.

SUMMARY OF THE INVENTION

A process has now been developed for the production of a beverage bottle-grade PET resin wherein the PET monomer contains specific antioxidant compounds in order to minimize the amount of regenerated acetaldehyde produced by the PET resin. In one embodiment this process comprises the addition of specific primary and secondary antioxidants to the PET monomer mixture in a predetermined order immediately after transesterification. In accordance with the present invention, an improved process is provided for producing polyethylene terephthalate chip which produces reduced amounts of regenerated acetaldehyde and is suitable for the molding of beverage containers using processes known in the art, comprising the steps of:

(a) providing a prepolymeric mixture comprising bis (2-hydroxyethyl) terephthalate, a polycondensation catalyst, a primary antioxidant in the form of a hindered phenol, and a secondary antioxidant in the form of a phosphonite;

(b) polycondensing said polymer prepolymeric mixture into polymer resin whereby said polymer resin produces regenerated acetaldehyde levels which are reduced by a minimum of 25%, as determined from samples heated at 280° C. for 5 minutes, and which further retains color values substantially equal to or better than PET resin which does not contain said primary and secondary antioxidants, as determined from amorphous samples.

Further in accordance with the present invention, there is also provided an improved process for producing polyethylene terephthalate resin suitable for the molding of beverage containers, comprising the above steps (a) through (b), wherein the conditions of these steps are preferably controlled to produce a molding resin which produces regenerated acetaldehyde levels which are reduced by a minimum of 25%, as determined from samples heated at 280° C. for 5 minutes, and which further retains color values substantially equal to or better than PET resin which does not contain said primary and secondary antioxidants, as determined from amorphous samples.

Still further, in another aspect of the present invention, there is also provided a process of molding a polyethylene terephthalate container, comprising the steps of melting a polymer produced by a process of the present invention, forming it into a desired shape and cooling the molten polymer. In a related aspect of the invention, articles molded by such a process are provided.

DESCRIPTION OF THE PREFERRED EMBODIMENTS

The terms "polyethylene terephthalate" and "PET" as used herein are used generally to include high-molecular weight polymers made by condensing ethylene glycol with dimethyl terephthalate or terephthalic acid no matter how prepared.

Furthermore, these terms are meant to include well-known polyethylene terephthalate polymers which are modified by the inclusion of minor amounts, e.g., less than about 20 percent by weight of the polymer, of comonomers or modifying agents, as is otherwise well known. Such comonomers or modifying agents include aromatic and aliphatic diols and polyols; aromatic and aliphatic carboxylic acids; or single molecules containing both carboxylic and alcohol functionality. Examples of diols include 1,4-butanediol, cyclohexanedimethanol, diethylene glycol and/ or 1,3-propanediol. Examples of carboxylic diacids include isophthalic acid, adipic acid, 2,6-naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. PET which contains such chain branching agents and chain terminating agents is described in U.S. Pat. No. 4,161,579, the disclosure of which is hereby incorporated by reference.

Although the terms polyethylene terephthalate and PET are meant to include polyethylene terephthalate polymers containing minor amounts of modifying agents or chain branching agents, for purposes of illustration only, the remainder of this specification is generally directed to PET which does not contain such added modifying agents or chain branching agents.

The PET useful in the process of the present invention may be prepared by either a batch or continuous polymerization process by any means known to those having ordinary skill in this art. For example, PET may be prepared by the ester interchange (transesterification) of dialkyl esters of terephthalic acid such as dimethyl terephthalate or by the esterification of terephthalic acid with ethylene glycol.

One embodiment of PET useful in the process of the present invention is prepared by a two step polymerization process which is comprised of first forming a bis-dihydroxy ester prepolymer by conventional transesterification techniques followed by polymerization (hereinafter referred to as polycondensation) of the prepolymer, as is widely known in the art.

The bis-dihydroxy ester prepolymer is formed from the transesterification of dimethylterephthalate with a glycol, such as ethylene glycol. PET prepared using a mixture of dimethyl terephthalate and ethylene glycol preferably contain the glycol in excess, i.e. mixtures wherein the molar ratio of glycol with respect to the dimethyl terephthalate is in the range of from about 2.0 to about 2.5.

A transesterification catalyst is employed to aid in the formation of the prepolymer. The catalyst employed is characterized as one which, upon exposure to the phosphor compounds described herein, is rendered substantially inactive.

Various catalysts are known in the art to be suitable for this transesterification step. The catalysts which may be used include organic and inorganic compounds of one or more metals such as manganese, cobalt, zinc, calcium, etc. Typical catalysts heretofore known and which may be utilized include, for example, cobaltous acetate tetrahydrate, manganese acetate (hereinafter "MnAc"), manganous benzoate tetrahydrate, zinc acetate tetrahydrate, etc. The amount of catalyst (or catalyst mixture) employed is that used in conventional systems, and is well known in that art.

The mixture of glycol, dimethyl terephthalate, and transesterification catalyst is then esterified to form prepolymer, as is well known in the art.

Upon completion of the transesterification reaction, certain phosphor containing compounds are introduced into the process in an effort to stabilize the process. These stabilizers function by sequestering the transesterification catalyst, thereby precipitating the transesterification catalyst from the prepolymeric mixture, as is widely known in this art. The use of phosphor containing compounds converts the esterification catalyst to an insoluble and catalytically inactive metal phosphate complex. The phosphor compound does not actually alter the thermal stability of the PET itself, but prevents the acceleration of thermal degradation leading to acetaldehyde precursors caused by the esterification catalyst which would otherwise remain active in the prepolymeric mixture.

The term "phosphor containing" compounds as used herein is intended to mean one or more compounds which contain phosphor and which are known in the prior art to be useful as stabilizers in polyester polycondensing reactions. Some of the phosphor compounds suitable for this process are disclosed in U.S. Pat. Nos. 3,028,366 (1962) and 3,962,189 (1976), the disclosure of which is hereby incorporated by reference. In one embodiment, polyphosphoric acid (PPA) is employed. The amount of phosphor containing compounds employed will vary depending on the amount of transesterification catalyst used.

After the phosphor compounds are introduced into the bis-dihydroxy ester prepolymer solution, catalysts may be added in order to aid the polycondensation process. These polycondensation catalysts are chosen so as to remain active in the presence of the phosphor containing compounds added previously. Various antimony compounds are known in the art to be suitable polycondensation catalysts. Any suitable form of antimony can be used, including antimony oxides, and either organic or inorganic compounds of antimony, such as antimony acetate, antimony oxalate, antimony glycoxide, antimony butoxide, and antimony dibutoxide. Antimony trioxide, $Sb_2O_3$, is presently preferred because of general availability.

Antimony is preferably present as an amount in the range of from about 150 to about 450 parts per million or more preferably from about 200 to about 300 parts per million parts by weight of the polymer product, as can be readily determined by preliminary tests for any particular case.

Other transition metal-containing compounds which may be employed either alone or in combination with the above-described antimony compounds, including germanium and titanium compounds. Although known in the art to increase brightness, the use of germanium compounds in particular is cost prohibitive. Preferred additional transition metal-containing compounds are titanium compounds. Examples of these compounds include titanium alkyloxides such as titanium oxalate, titanium acetate, titanium butylate, titanium benzoate, titanium isoproprylate, tetrabutyl titanate, acetyl triisopropyl titanate, titanium tetraisopropoxide and titanium glycolate. Complex titanates derived from alkali or alkaline-earth metal alkoxides and esters of titanic acid are also very effective. Inorganic titanates, such as lanthanum titanate, mixtures of calcium acetate and antimony dioxide, are further examples of titanium based catalysts which can be used.

In an alternative embodiment, it has been found that catalysts which contain titanium may be used as the sole polycondensation catalyst. In particular it has been found that titanium alkyloxide in the form of potassium titanyl oxalate, KTiOx, may be used as the sole polycondensation catalyst.

If desired, the polycondensation catalyst may be added at the beginning of the transesterification stage of the process. This is particularly advantageous for operation of the process continuously. However, if titanium polycondensation catalysts are employed, they must be added after transesterification catalyst has been sequestered, due to the fact that titanium has a strong interaction with the phosphor stabilizer.

Subsequent to the substantial completion of the transesterification reaction and addition of stabilizer and polycondensation catalyst, a two component antioxidant package is introduced into the process. The first component of the antioxidant package consists of a primary antioxidant in the form of a hindered phenol, added after the polycondensation catalyst has been allowed to equilibrate for a minimum of approximately 10 minutes in the system. Primary antioxidants function as radical scavengers. Hindered phenols are defined as molecules in which the phenol moiety is sterically hindered by bulky substituent groups. These bulky substituent groups are moieties such as ter-butyl, which are attached immediately adjacent to both sides of the phenol group. Complete hindrance, which represents the greatest degree of hindrance attainable, is preferable for the instant invention.

In alternative embodiments, either a monofunctional or a tetrafunctional hindered phenol may be employed in the instant invention. Further, bifunctional hindered phenols are also believed to provide similar useful properties.

In one preferred embodiment of the instant invention, the primary antioxidant is a tetrafunctional hindered phenol. Tetrafunctional hindered phenol may be added in an amount ranging generally from about 0.01 to 0.50 weight percent based on the weight of the polymer, preferably from in the range of 0.025 to 0.075.

A trivalent phosphorous compound, the second component contained in the antioxidant package, is then added to the transesterified mixture after allowing the primary antioxidant to equilibrate for approximately 10 minutes. The trivalent phosphorous compound serves as a secondary antioxidant, or peroxide decomposer. Trivalent phosphorus compounds include phosphonite and phosphite compounds. In the preferred embodiment, the trivalent phosphorus compound is based on phosphonite. In one specific example of the preferred embodiment, the phosphonite is aryl phosphonite produced by the reaction of phosphorus trichloride with 1,1'-biphenyl and 2,4-bis(1,1-dimethylethyl)phenol, commercially available from Clariant under the trade name of Sandostab PEPQ (PEPQ). PEPQ may be added in an amount ranging generally from about 0.01 to 0.5 weight percent based on the weight of the polymer and preferably from 0.025 to 0.075.

The use of a two component antioxidant package is advantageous over the use of a single compound or additive containing dual functionality. The use of a two component package allows each constituent in the package to be varied and added independently, thereby allowing the resin performance to be specifically tailored for various end uses.

It has been found that when employing antimony based polycondensation catalysts, it is critical that the hindered phenol be added prior to the trivalent phosphorous compound. Without this step, the antimony catalyst interacts with trivalent phosphorous compounds, reducing the effectiveness of the catalyst, leading in turn to significantly longer polycondensation times. However, when employing a titanium % polycondensation catalyst, it is postulated that the order of antioxidant addition may not be critical.

Although in the preferred embodiment the antioxidant is added immediately prior to the start of the polycondensation reaction, the antioxidant package may be added at alternative points in the process. In one embodiment, it has been proposed that the antioxidant package may be added prior to direct esterification. In a second embodiment, the antioxidant package may be added to PET resin subsequent to polycondensation. In this second embodiment, the antioxidant package may be added either prior to pelletization or during the injection molding process.

The process of the present invention further comprises polycondensing (polymerizing) the bis-dihydroxyester prepolymer mixture at reduced pressures and elevated temperatures until a polyester of the desired intrinsic viscosity is obtained.

The process of this invention is applicable to the preparation of polyesters derived from dimethyl terephthalate. One or more additional esters, however, may also be incorporated in up to about 20 mole % based on a total ester content of 100 mole %. Other well-known polyester-forming esters include those based on the diacids isophthalic acid, 1,4-cyclohexanedicarboxylic acid and linear lower alkyl diacids such as succinic, glutaric, adipic, sebacic, maleic, fumaric acids, etc.

The glycol component employed in the process of this invention comprises any diol or polyol. Although ethylene glycol is the preferred glycol, the glycol component may comprise a mixture of one or more glycols wherein at least a major portion of which is ethylene glycol. The term "major portion" as used herein is intended to mean that greater than about 50 mole percent and preferably greater than about 85 mole percent, based on the total amount of glycol present, of ethylene glycol is employed. Thus, other known polyester-forming glycols may be employed in amounts less than about 50 mole percent and preferably less than about 15 mole percent. Examples of additional glycols include diethylene glycol; 1,4-cyclohexanedimethanol; propylene glycol, 1,4-butanediol, 2,2,4-trimethyl-1,3-pentanediol; 2,2-dimethyl-1,3-propanediol, etc.

In an alternative embodiment, the bis-dihydroxy ester prepolymer may be prepared from a mixture of terephthalic acid, ethylene glycol, as is widely known in the art.

The temperatures and pressures employed to produce PET based on the instant process are those conventional for polyester production.

The PET reaction product may then be extruded at an elevated temperature into water and allowed to solidify therein. The solid PET may then be pelletized by means known to those skilled in this art. For example, the PET may be pelletized using an underwater pelletizer.

The PET useful in the present invention may be in any form such as pellets, chips, or granules, preferably of relatively uniform size and shape. For ease of reference, the PET will hereinafter be referred to as PET chip but it is understood that the present invention is applicable to PET in any form and the term PET chip is meant to include PET in any form.

In an alternative embodiment, PET may be produced using a continous process in which the PET reaction product is directly extruded into final form, rather than chip. Such direct extrusion is known in the art for use in producing film, fiber, and other articles.

The PET thus produced generates at least 25% less regenerated acetaldehyde than PET resin which does not contain the antioxidant package of the instant invention, as determined from samples held at 280° C. for 5 minutes.

The PET chip of the instant invention also provides color suitable for use in food packaging. In the preferred embodiment color of sufficient quality to replicate clear glass is provided.

The PET chip as prepared does not have physical properties suitable for use in blow molding. The PET chip does not have suitable molecular weight for use in blow molding, as indicated by low intrinsic viscosity. In order to improve the physical properties of the PET chip, the chip is subjected to solid state polymerization, as is known in the art and described in U.S. Pat. No. 4,223,128.

The intrinsic viscosity of this stabilized PET chip is generally from about 0.50 to about 1.0, preferably from about 0.65 to about 0.85 deciliters per gram based upon calculations made from measurements in o-chlorophenol at 25° C. The specific preferred range of intrinsic viscosity depends on end use.

The PET produced by the present invention may be used to produce containers such as PET bottles because of the small amount of latent acetaldehyde contained in this PET. One who molds such bottles is provided with more forgiving resin which provides a broader operating window during injection molding in terms of temperature and residence time. Alternately, one who molds a bottle from PET having a low acetaldehyde content under optimum temperature and time conditions could provide a bottle which has superior characteristics because of this low regenerated acetaldehyde level.

Apart from carbonated beverage and water bottles, PET having very low regenerated acetaldehyde is useful for bottles for white liquors, white wine, and is particularly useful for making containers for cheese, since cheese is very sensitive to the presence of acetaldehyde. Also, PET having low regenerated acetaldehyde values is of great value in the manufacture of small PET bottles, their ratio of surface area to volume being larger than it is with larger bottles. Small bottles having a large surface area to volume ratio would more easily transfer acetaldehyde to their contents than would a larger bottle.

The PET produced by the process of the invention may be molded into containers of various types. The PET may be molded by so-called reheat blow molding, injection blow molding, and/or extrusion blow molding. If extrusion blow molding is desired, it is generally important to include with the PET minor amounts of the modifying or chain branching agents described hereinabove in order to sufficiently increase the melt strength of the PET.

The PET polymer may be molded by melting the PET, forming it into a desired preform shape, cooling the molten preform, reheating the preform above its glass transition temperature, and then blow molding into the desired container shape.

The PET may also be extruded into sheets and cooled. Containers may be formed from these sheets.

The PET may also be directly injection molded into a finished solid article by melting the PET, injecting it into a mold, and cooling the PET to room temperature.

The physical property values and characteristics in the present invention including Examples were measured or are defined as follows:

(1) Regenerated Acetaldehyde (RA)

Typically, bottle manufacturers specify acceptable levels of acetaldehyde based on measurements made in the bottle's head space subsequent to molding. Bottle head space acetaldehyde specifications are generally less than 4 µg/l for cola beverages and less than 1 µg/l for water applications. In this work, the measurement technique employed is intended for use in the comparison of resins, rather than to determine the absolute amount of acetaldehyde produced in a bottle. Further, amorphous resin which had not been subjected to solid state polymerization was used for all testing.

The amount of regenerated acetaldehyde produced by a given sample was determined using gas chromatography (GC) performed on the head space of heated samples. A sample of PET chip was ground in a liquid nitrogen freezer mill. The free acetaldehyde contained in the sample was removed by heating the sample under vacuum at 160° C. for 8 hours. The sample was then placed in a head space vial, sealed under helium purge, and heated at the given temperature of interest for a specified length of time. After subjecting the samples to the temperature of interest for the requisite amount of time, the sample vials were held at 150° C. until tested, in order to ensure that the regenerated acetaldehyde remained in the vapor state. Approximately 0.30 ml of head space vapor was subjected to GC analysis.

Regenerated acetaldehyde levels were determined from the vapor space of samples which had been held at 240° C. for 10 minutes, 280° C. for 5 minutes, and 280° C. for 10 minutes, respectively.

(2) Color Measurements

Color values for the instant invention are described in terms of yellowness and brightness. Yellowness and brightness values are quantified respectively as the b* and L* values on a L*,a*,b* color scale, also referred to as the Gardner Color System, a color measurement technique well known to those skilled in this art. In the present method, the color of ground PET chip was determined using a Gardner XL-23 Colorimeter. The brightness value, or L* value, measures the total percentage reflectance of a sample. A value of 100 represents perfect reflectance. The particles are yellow if the "b" value is positive and blue if the "b" value is negative. One unit difference in these numbers is perceptible to the eye. In the instant invention, high L* values and low b* values are desirable.

(a) Color Measurements of Untreated Samples

Color was determined using samples prepared from amorphous resin which was ground to 1–2 mm particle size and had not been subjected to heat treatment following polycondensation. Unless otherwise indicated, all color values provided were taken from untreated samples.

(b) Color Measurements of Heat Treated Samples

For several samples, color was determined using samples prepared from amorphous resin which were subjected to a heat treatment of 240° C. for 24 hours in air following polycondensation. This heat treatment was employed in order to exaggerate the color shift induced in the polymer during degradation.

EXAMPLES

The following Examples are given as specific illustrations of the claimed invention. It should be understood however, that the invention is not limited to the specific details set forth in these Examples. All parts and percentages in the Examples as well as in the remainder of the specification are by weight unless otherwise specified.

Examples 1 to 7

Samples were prepared in a small lab scale autoclave in order to determine the effect of the various antioxidant packages on conventional PET resin. Example 1 was prepared from DMT based PET, formed by the transesterification of dimethyl terephthalate and ethylene glycol according to a conventional method (235° C.) in the presence of approximately 330 ppm MnAc ester interchange catalyst. Following recovery of about 95% of the methanol theoretically produced by the prepolymeric mixture, approximately 100 ppm polyphosphoric acid (PPA) was added to stabilize the manganese catalyst. Approximately 285 ppm antimony trioxide ($Sb_2O_3$) was then added to the esterified prepolymer to act as a polycondensation catalyst. Following addition of the polycondensation catalyst, the esterified prepolymer mixture was subjected to elevated temperature (280° C.) and reduced pressure in order to produce polymer of a suitable molecular weight, as is known in the art.

Example 2, containing an antioxidant package of interest, was prepared using the method of Example 1, with the following exceptions. First, the polycondensation catalyst was allowed to equilibrate in the esterified monomer mixture for about 10 minutes subsequent to its addition. Phosphonite (hereinafter "P"), in the form of Sandostab PEPQ from Clariant, was added to the esterified mixture. The esterified monomer mixture containing the antioxidant package was then subjected to elevated temperatures and reduced pressures equivalent to those of Example 1 in order to induce polycondensation, as is well known in the art.

Example 3 was prepared using the method of Example 2, except that a tetrafunctional hindered phenol (hereinafter "T"), in the form of tetra bis(methylene (3,5-di-tert-butyl-4-hydroxyhydrocinnumate)) methane, commercially available as Irganox 1010 from Ciba Specialty Chemical, was substituted for the phosphonite.

Example 4 was prepared using the method of Example 2, except that Irganox 1010 was added to the esterified mixture following the equilibration of the polycondensation catalyst. The Irganox 1010 was then allowed to equilibrate approximately 10 minutes prior to the addition of the phosphonite.

Examples 5 and 6 were prepared as Example 4, except Irganox 1135, available commercially from Ciba Specialty Chemical, a lower molecular weight, monofunctional hindered phenol in the form of 3,5-di-tert-butyl-4-hydroxyhydrocinnamic acid, c7-9 -branched alkyl esters (hereinafter "M") was added rather than the tetrafunctional hindered phenol.

Example 7 was prepared using the method of Example 4, except that Ultranox 626 (hereinafter "B"), a molecule containing both phosphite and hindered phenolic functionality (also referred to as a hindered phosphite) was substituted for the phosphonite. Ultranox 626 is bis-(2,4-di-tertbutyl-phenyl)-pentaerythritol diphosphite, commercially available from General Electric.

Data illustrating the evaluation of the resin properties resulting from these various formulations is illustrated in Table 1.

TABLE 1

Effect of Antioxidant Type and Amount on Color

| | Primary AOx | | Secondary AOx | | Treated | Untreated |
|---|---|---|---|---|---|---|
| EX ID | ID | Amt (wt %) | ID | Amt (wt %) | Color b* | Color L*, b* |
| 1 | None | | None | | | 41.7 87.4, 3.7 |
| 2 | None | | P | .10 | 33.7 | 77.4, 2.8 |
| 3 | T | .05 | None | | — | 82.4, 5.4 |
| 4 | T | .05 | P | .05 | 19.5 | 83.4, 3.0 |
| 5 | M | .05 | P | .05 | 32.7 | 83.0, 3.5 |
| 6 | M | .10 | P | .05 | 23.8 | 83.9, 3.6 |
| 7 | T | .05 | B | .05 | — | 69.8, 5.2 |

A comparison of Examples 1 to 4 indicates the synergistic nature of the antioxidant package. Although significantly less yellow in color than the control, Example 2, which contains phosphonite as the sole antioxidant, exhibits a grey cast, as indicated by a low L* value. Conversely, Example 3, containing a tetrafunctional hindered phenol as the sole antioxidant, provides adequate brightness, but yields a higher yellowness value than the control. Example 4, in which a tetrafunctional hindered phenol is employed prior to the phosphonite addition, shows significant overall color improvement in comparison to Examples 2 and 3. As shown, Example 4 provides both suitable brightness and yellowness values, in comparison to the control.

The positive synergistic effect of these antioxidants is more clearly shown by comparison of Treated Color Values, an assay designed to exaggerate the yellowing response within the resin for comparative purposes. Yellowing in general is believed to indicate polymer degradation. A comparison of Treated Color Values for Examples 1, 2 and 4 further indicates the benefit of the synergistic mixture of antioxidants seen in Example 4.

A comparison of Examples 5 and 6 to Example 4 indicates that monofunctional phenols may be substituted for the tetrafunctional phenol. Further, bifunctional phenols are also believed to provide similar useful properties.

A comparison of Example 4 with Example 7 indicates that superior performance of phosphonite as a trivalent phosphorus. Use of phosphite as a trivalent compound leads to increased polymer degradation, as indicated by the increased b* value. Further, the polymer exhibits a gray color, as indicated by a lower L* value. Although the particular combination of Example 7 may provide reduced regenerated acetaldehyde, its usefulness is limited to non-color critical applications , such as those uses replacing colored glass.

Examples 8 to 10

A series of samples were provided in order to compare regenerated acetaldehyde for polymer containing the preferred antioxidant package to conventional polymer, and polymer containing various levels of hindered phenol.

Example 8 was prepared based on the method of Example 1. Example 9 was prepared based on the method of Example 3, except that in Example 9 approximately 0.10 wt % of T was added. Example 10 was prepared using the method of Example 4.

Data illustrating the evaluation of the resin properties is illustrated in Table 2.

TABLE 2

Effect of Antioxidant Package on PC Time, Untreated Color and Regenerated Acetaldehyde using an Antimony based Polycondensation Catalyst.

| EX | AOx | Avg. PC Time (min) | Untreated Color L* | b* | RA 240 °C. for 10 min (ppm) | RA 280 °C. for 5 min (ppm) | RA 280 °C. for 10 min (ppm) |
|---|---|---|---|---|---|---|---|
| 8 | No | 125 | 85.6 | 6.0 | 15 | 129 | 228 |
| 9 | Yes | 265 | 85.2 | 5.4 | — | 48 | — |
| 3 | Yes | 170 | 82.4 | 5.4 | — | 70 | — |
| 10 | Yes | 135 | 85.8 | 5.0 | 10 | 29 | 141 |

Comparison of Examples 3, 9 and 10 clearly indicates the effect of the preferred antioxidant package on reducing regenerated acetaldehyde under a variety of testing conditions. The reduction was its mildest, although nonetheless highly significant for samples treated at 240° C. for 10 minutes, decreasing regenerated acetaldehyde by 33%. The effect of the antioxidant package was exacerbated at higher temperatures, reducing regenerated acetaldehyde by 78% for samples subjected to 280° C. for 5 minutes, and reducing the regenerated acetaldehyde 38% for samples heated at 280° C. for 10 minutes. The amount of regenerated acetaldehyde produced at 280° C. for 5 minutes is of particular importance, because this condition most closely replicates pre-form injection molding conditions. Therefore, based on a comparison of a the above examples, the addition of a hindered phenol/phosphonite antioxidant package will greatly reduce the regenerated acetaldehyde formed during the bottle manufacturing process.

Further, a comparison of the Examples 10 and 8 indicates that the antioxidant package does not have a detrimental effect on the polycondensation catalyst, as indicated by the similar PC times and color results for the two separate examples. A comparison of untreated color results for samples 8 and 10 confirms the use of this antioxidant package in PET resin intended for use in clear glass replacement.

Examples 9 and 3 indicate that the addition of hindered phenol without the use of trivalent phosphorous reduces regenerated acetaldehyde. However, the use of the hindered phenol alone leads to unacceptably lengthy polycondensation time, which has a dramatic economic impact on resin production. Further, the synergistic benefit of the use of hindered phenol in conjunction with phosphonite is shown by comparison of Examples 3, 9 and 10, which indicates that the use of a two component antioxidant package yields superior color and polycondensation times, while producing a minimal amount of regenerated acetaldehyde.

Examples 11 to 15

A series of samples were produced to determine a suitable range of addition for the various components of the antioxidant package. Examples 11 through 15 were all prepared using the method of Example 3.

TABLE 3

AOP Optimization, Based on Heat Treated Color Values.

| EX | Tetra-funct Hindered Phenol Amount (wt %) | Phosphonite Amount (wt %) | Treated b* |
|---|---|---|---|
| 1 | 0 | 0 | 41.7 |
| 11 | 0.025 | 0.025 | 32.1 |
| 4 | 0.05 | 0.05 | 19.5 |
| 12 | 0.075 | 0.075 | 27.4 |
| 13 | 0.10 | 0.10 | 40.7 |
| 14 | 0.025 | 0.075 | 37.4 |
| 15 | 0.075 | 0.025 | 40.5 |

As indicated by the significantly improved heat treated color values of Examples 12, 4 and 11, equal amounts of tetrafunctional hindered phenol and phosphonite, varying in amount from about 0.025 to 0.075 weight percent based on the weight of the polymer, provides a significant improvement in the retardation of polymer degradation. It is further expected that use of levels of up to 0.5 weight percent of tetrafunctional hindered phenol and phosphonite would yield similarly beneficial results.

Examples 16 to 26

Samples were prepared to determine the effect of the antioxidant package on PET resin employing a titanium based polycondensation catalyst. Example 16 was prepared from DMT based PET, based on the procedure of Example 1, except that KTiOx was added to the esterified prepolymer to act as a polycondensation catalyst, rather than $Sb_2O_3$. Approximately 12 ppm of Ti was employed.

Examples 17 through 26 were prepared based on the methods of Examples 1 through 15, except that KTiOx was again substituted for the $Sb_2O_3$ catalyst, approximately 75 ppm PPA was added and various amounts and combinations of antioxidants were employed, as described in Table 4. In particular, the effectiveness of single component antioxidant packages and various ratios of the two component antioxidant packages of interest were investigated.

TABLE 4

Effect of Various Antioxidant Combinations on PET Resin Employing Ti PC Catalysts.

| Ex | ID | Hindered Phenol Amt (wt %) | P Amount (wt %) | PC Time (min) | RA 280 °C. 5 min (ppm) | Untreated Color L*, b* |
|---|---|---|---|---|---|---|
| 16 | None | | None | 65 | 353 | 87.3, 9.8 |
| 17 | T | .05 | None | 70 | 111 | 90.1, 9.6 |
| 18 | T | .10 | None | 55 | 68 | 87.4, 11.4 |
| 19 | M | .10 | None | 100 | 70 | 90.4, 10.1 |
| 20 | None | | .05 | 90 | 124 | 89.1, 9.4 |
| 21 | None | | .10 | 115 | 46 | 89.6, 7.1 |
| 22 | T | .05 | .05 | 65 | 120 | 89.5, 8.3 |
| 23 | T | .025 | .025 | 70 | 125 | 91.1, 7.3 |
| 24 | M | .05 | .05 | 85 | — | 90.1, 7.6 |
| 25 | M | .10 | .05 | 80 | 71 | 91.2, 6.0 |
| 26 | M | .05 | .025 | 80 | 126 | 90.3, 7.3 |

As indicated by a comparison of Examples 16 and 8, the use of KTiOx significantly increases the amount of regenerated acetaldehyde produced, as well as associated yellowness values; however, a striking reduction is noted in the time required to complete the polycondensation reaction.

The use of hindered phenol alone decreases the generation of acetaldehyde, but does not provide improved b* values, as shown by Examples 17 through 19.

Similarly, the use of phosphonite alone, while effective at reducing regenerated acetaldehyde, leads to longer a longer polycondensation period, as shown by a comparison of Examples 20 and 21.

The synergistic effect of a hindered phenol in combination with a phosphonite is shown in Examples 22 through 26. These samples provide a balance of superior polycondensation times, improved regenerated acetaldehyde and preferable color in comparison to PET produced using titanium catalyst alone.

As shown in Example 25, an excess of monofunctional hindered phenol again provides benefits over the use of equal portions of these components.

A comparison of the amount of regenerated acetaldehyde produced by Examples 16 and 22 when measured at 280° C. for 5 minutes, conditions which most closely replicate the bottle manufacturing process, indicates that the antioxidant package reduces regenerated acetaldehyde in PET resin prepared using a polycondensation catalyst which contains titanium by 66%, a significant amount.

Further, a comparison of the Examples 16 to Examples 22 to 26 indicates that the two component antioxidant package does not have a detrimental effect on the KTiOx polycondensation catalyst, as indicated by the similar PC times and preferable color results for the four examples containing hindered phenol and phosphonite. This result is surprising in light of the fact that usually KTiOX is easily deactivated by phosphate or phosphite compounds.

Also unexpectedly, a comparison of Examples 1 and 8 with Examples 17 through 26 indicates that the use of a polycondensation catalyst which contains titanium in conjunction with appropriate antioxidant package yields a significantly brighter PET resin.

Example 27

A full investigation of regenerated acetaldehyde generation by Example 22, the sample exhibiting optimum polycondensation time with adequate color and acceptable regenerated acetaldehyde values at 280° C. for 5 min was determined. Example 27 was prepared using the method of Example 16.

TABLE 5

Effect of Antioxidant Package on Color and Full Range of Regenerated Acetaldehyde Methods for PET Employing Titanium Based PC Catalyst.

| Ex | AOP | Untreated Color L* | Untreated Color b* | RA 240 °C. 10 min (ppm) | RA 280 °C. 10 min (ppm) |
|---|---|---|---|---|---|
| 22 | Yes | 89.5 | 8.3 | 23 | 141 |
| 27 | No | 87.4 | 9.3 | 185 | 339 |

As indicated by a comparison of Examples 27 and 22, regenerated acetaldehyde measured at 240° C. for 10 minutes was reduced by about 87% and about a 58% reduction was shown at 280° C. using a 10 minute heating period.

Therefore, based on the results above, the addition of the specific antioxidant package of the instant invention would enable use of polycondensation catalysts which contain titanium. The increased effectiveness of titanium polycondensation catalysts leads to shorter polycondensation times, allowing increased polymer throughput, thereby producing a PET resin which is significantly more economically attractive.

Although the data indicates that a range of 0.025 to 0.075 weight percent tetrafunctional phenol and phosphonite are effective, it is expected that use of amounts of up to 0.5 weight percent of both of these compounds would yield similarly beneficial results.

Further, based on the Examples above, the amount of regenerated acetaldehyde produced by PET manufactured by the method of the instant invention may be expected to be reduced by a minimum of at least 25% in comparison to conventional PET resin. Based on the carbonated beverage industry standard of 4 μg/l regenerated acetaldehyde produced in a bottle head space for conventional PET resin, the PET of the instant invention is expected to produce less than 3 μg/l regenerated acetaldehyde under identical conditions. This minimal amount of regenerated acetaldehyde makes the resin of the instant invention more preferable for use in more stringent markets, such as mineral water, as well.

What is claimed is:

1. A process for producing a polyester resin, said process comprising the steps of:
   (a) providing a prepolymeric mixture comprising a bis (2-hydroxyethyl) terephthalate, a polycondensation catalyst, a primary antioxidant in the form of a hindered phenol, and a secondary antioxidant in the form of a phosphonite;
   (b) polycondensing said prepolymeric mixture into a polyester polymer resin; whereby said polymer resin produces reduced regenerated acetaldehyde levels, as determined from head space analysis, and which further retains color values substantially equal to or better than polyester resin which does not contain said primary and secondary antioxidants.

2. The process of claim 1, wherein the process is further comprised of subjecting said polymer resin of step (b) to extrusion into a water bath in order to quench said polymer resin and pelletizing said quenched polymer resin.

3. The process of claim 2, wherein the process is further comprised of subjecting said pelletized polymer resin to a solid state polymerization process.

4. The process according to claim 1, wherein said bis (2-dihydroxyethyl) terephthalate is provided by reacting dimethyl terephthalate and ethylene glycol in the presence of a transesterification catalyst.

5. The process according to claim 1 wherein said bis (2-hyrdroxyethyl) terephthalate is formed from the reaction of terephthalic acid with ethylene glycol.

6. The process according to claim 4, wherein said secondary antioxidant is added to a mixture comprised of a polycondensation catalyst which contains antimony and a primary antioxidant.

7. The process according to claim 5, wherein said secondary antioxidant is added to a mixture comprised of a polycondensation catalyst which contains antimony and said primary antioxidant.

8. The process according to claim 4 wherein said process further comprises:
   (a) precipitating the transesterification catalyst;
   (b) adding a polycondensation catalyst which contains titanium to the precipitated prepolymeric mixture.

9. The process according to claim 5 wherein said polymer processing stream is further comprised of a polycondensation catalyst which contains titanium.

10. The process according to claim 5 wherein said polymer processing stream is further comprised of a direct esterification catalyst which contains titanium.

11. The process according to claim 6, wherein said polycondensation catalyst which contains antimony may be chosen from the group consisting of: antimony trioxide, antimony oxalate, antimony glucoxide, antimony butoxide, and antimony dibutoxide.

12. The process according to claim 11, wherein said polycondensation catalyst further comprises a compound which contains titanium, thereby forming a mixture of antimony and titanium based polycondensation catalyst compounds.

13. The process according to claim 7, wherein said polycondensation catalyst which contains antimony may be chosen from the group consisting of: antimony trioxide, antimony oxalate, antimony glucoxide, antimony butoxide, and antimony dibutoxide.

14. The process according to claim 13, wherein saidpolycondensation catalyst further comprises a compound which contains titanium, thereby forming a mixture of antimony and titanium based polycondensation catalyst compounds.

15. The process according to claim 8, wherein the polycondensation catalyst which contains titanium may be chosen from the group consisting of the following organic titanates and titanium complexes: titanium oxalate, titanium acetate, titanium butylate, titanium benzoate, titanium isoprylate, and potassium titanyl oxalate.

16. The process according to claim 9, wherein the polycondensation catalyst which contains titanium may be chosen from the group consisting of the following organic titanates and titanium complexes: titanium oxalate, titanium acetate, titanium butylate, titanium benzoate, titanium isoprylate, and potassium titanyl oxalate.

17. The process according to claim 10, wherein the direct esterification catalyst which contains titanium may be chosen from the group consisting of the following organic titanates and titanium complexes: titanium oxalate, titanium acetate, titanium butylate, titanium benzoate, titanium isoprylate, and potassium titanyl oxalate.

18. The process according to claim 15, wherein said organic titanate is potassium titanyl oxalate.

19. The process according to claim 16, wherein said organic titanate is potassium titanyl oxalate.

20. The process according to claim 17, wherein said organic titanate is potassium titanyl oxalate.

21. The process according to claim 1, wherein said hindered phenol may be chosen from a group consisting of: monofunctional hindered phenol, difunctional hindered phenol, and tetrafunctional hindered phenol.

22. The process according to claim 21, wherein said hindered phenol is a tetrafunctional hindered phenol.

23. The process according to claim 22, wherein the tetrafunctional hindered phenol is tetra-bis (methylene (3,5-di-tert-butyl-4-hydroxyhydrocinnumate)) methane.

24. The process to claim 22, wherein said hindered phenol is present in the amount of 0.01 to 0.50 weight percent based on the weight of the polymer.

25. The process according to claim 24, wherein said hindered phenol is present in the amount of 0.05 weight percent, based on the weight of the polymer.

26. The process according to claim 1, wherein said phosphonite is an aryl phosphonite.

27. The process according to claim 26, wherein said aryl phosphonite is produced by the reaction of phosphorus trichloride with 1,1'-biphenyl and 2,4-bis(1,1-dimethylethyl) phenol.

28. The process according to claim 26, wherein said aryl phosphonite is present in an amount from 0.01 to 0.50 weight percent based on the weight of the polymer.

29. The process according to claim 28, wherein said aryl phosphonite is present in the amount of 0.05 weight percent based on the weight of the polymer.

30. The process according to claim 1, wherein:
   (a) an esterified prepolymeric mixture is provided by reacting dimethyl terephthalate with ethylene glycol in the presence of 330 ppm manganese acetate transesterification catalyst;
   (b) sequestering said manganese acetate catalyst using 100 ppm polyphosphoric acid;
   (c) adding a 0.05 weight percent of a tetrafunctional hindered phenol, based on the weight of the polymer;
   (d) equilibrating said esterified prepolymeric mixture;
   (e) adding 0.05 weight percent aryl phosphonite, based on the weight of the polymer;
   (f) polycondensing said prepolymeric mixture in order to form a polymer resin,
whereby said polymer resin produces reduced regenerated acetaldehyde levels, as determined from head space analysis, and which further retains color values substantially equal to or better than PET resin which does not contain said primary and secondary antioxidants.

31. A process for producing a polyester resin having low levels of regenerated acetaldehyde, said process comprising the steps of:
   (a) providing polyethylene terephthalate resin;
   (b) adding a primary antioxidant in the form of a hindered phenol;
   (c) adding a secondary antioxidant in the form of an aryl phosphonite;
whereby said polymer resin produces reduced regenerated acetaldehyde levels, as determined from head space analysis, and which further retains color values substantially equal to or better than PET resin which does not contain said primary and secondary antioxidants.

32. A resin comprising: polyethylene terephthalate, a hindered phenol, and an aryl phosphonite, whereby said resin provides reduced regenerated acetaldehyde levels, as determined from head space analysis, and which further retains color values substantially equal to or better than PET resin which does not contain said primary and secondary antioxidants.

33. A beverage container comprising a molded body of polyethylene terephthalate, said beverage container providing reduced regenerated acetaldehyde levels, as determined from head space analysis, and which further retains color values substantially equal to or better than PET resin which does not contain said primary and secondary antioxidants.

* * * * *